United States Patent Office 3,730,741
Patented May 1, 1973

---

3,730,741
METHOD FOR REMOVING EXCESS MOISTURE FROM WATER-BATH CHILLED POULTRY CARCASSES
Ralph S. Zebarth, Bldg. 1, Apt. 2, North Cliff Colony Apartments, Thompton Bridge Road, Gainesville, Ga. 30501
No Drawing. Continuation-in-part of application Ser. No. 2,352, Jan. 12, 1970. This application Nov. 8, 1971, Ser. No. 196,541
Int. Cl. A23b 1/06
U.S. Cl. 99—194                                        12 Claims

ABSTRACT OF THE DISCLOSURE

A method of removing excess moisture from cleaned water-bath chilled poultry carcasses, preparatory to cut-up, packaging or freezing thereof, consisting of positioning each carcass with the abdominal evisceration opening lowermost, subjecting the carcass to a quiet atmosphere of sub-freezing air till most of the excess moisture has been expelled from the sub-dermal fascia layers at the exterior surface of the carcass, then subjecting the carcass to a high velocity blast of sub-freezing air, until the total heat content of the carcass, will produce a uniform temperature above the freezing temperature of the flesh, but below the flowing temperature of the body fluids, and until any moisture frozen on the surface of the carcass is vaporized by sublimation and carried away.

---

This application is a continuation-in-part of my copending application Ser. No. 2,352, filed Jan. 12, 1970, now abandoned and entitled "Method of Preparing Poultry for Packing, Packaging, or Cut-Up," and relates particularly to the moisture removal aspects of the general method disclosed therein.

This invention relates to new and useful improvements in methods of removing excess moisture from poultry carcasses which have previously been chilled in ice-water baths, preparatory to cut-up and packaging thereof, whether the poultry is eventually to be stored, shipped, and sold in either fresh or unfrozen, or frozen form.

Presently, poultry is prepared for packing, packaging or cut-up by immersing it for a time in an ice-water chilling bath, of course after it has been killed, picked and eviscerated, until its body heat has been removed and its temperature has been lowered as far as practical by this means, usually to about 34–38 deg. Fahr. For fresh-packing, it is then cut up into parts, if it is to be sold in this condition, or it may be left in whole carcasses. The carcasses or parts are then packed or packaged with crushed ice or other refrigeration, and maintained at about the same 34–38 degrees at all points during storage, shipping, and display for sale. If it to be frozen, it is frozen after cup-up and packaging. The above described presently used method has certain definite and costly disadvantages. The birds cannot be preshaped to a neat, attractive squatted position with wings and legs folded against the torso, if packed or packaged in this condition, because they are still essentially limp and will not retain said position. Hence the legs and wings project at awkward angles from the torso with the result that relatively large boxes or cartons are required to contain relatively few carcasses. If the carcasses are cut up in this condition, the cutting tends to be difficult, since the flesh flows or yields ahead of the cutting knives. The cutting of muscle fibers while said fibers still possess some resilient tension, also tends to produce relatively tough meat, since the muscles then contract into comparatively thick, hard masses. Also, the skin is quite loose at this time, and the cutting knives tend to pull it away from the flesh and cut it unevenly. The skin seldom returns to its normal position, and an unsightly appearance often results. Ice-pack poultry often has an unsightly, less marketable appearance even in whole carcasses, having a loose-fleshed, slack appearance with lose and often wrinkled skin. Also, the product has a relatively short shelf-life since at temperatures above freezing, bacterial growth on and in the carcass, though slowed, is far from completely arrested.

However, while the above problems are important, and while the present method in large measure solves them, nevertheless by far the most costly and vexing problem to poultry processors, whether the poultry is for fresh-pack or frozen marketing, is that of the removal and disposal of excess moisture picked up by the poultry in the ice-water chilling bath step, which precedes the cut-up, packing or packaging step, and it is the primary object of the present invention to provide a process suitable for overcoming these excess moisture problems. The birds do pick up perhaps 12–14% by weight, of excess moisture from the ice water baths, and seldom can drain down to less than about 10% excess moisture in a normal travel time from the chilling tanks to the stations where they are cut-up and/or packaged. The water enters mainly under the skin at the cut edges thereof surrounding the abdominal opening formed in the evisceration process, and surrounding the neck opening formed when the neck is removed, and lodges, so far as it is substantially retained to any substantial degree, principally in the fatty fascia layer between the skin and the flesh, and to a smaller degree in the skin itself, which is porous. This fact is easily demonstrated by placing a dye in the chilling bath water, chilling a bird therein in the usual manner, draining and freezing the bird in any suitable manner, then severing the bird into pieces to examine the disposition of the dye. It will be found to be concentrated principally in the fascia layer, and to a lesser degree in the skin itself, with virtually none having penetrated into the flesh. The worst areas are commonly in the area of the lower abdomen and inner thigh surfaces, which for convenience will be designated the "flanks" of the bird, where the skin is quite loose. Chilling bath water concentrates heavily in this area, often accumulating in substantial pockets of free water.

If the poultry is eventually to be frozen, the moisture removal problems arise from the fact that Department of Agriculture regulations limit the permissible amount of excess or pick-up moisture to 8%, and also prohibit the presence of free ice in the packages in which the poultry is eventually sold. The allowable 8% has apparently been set in view of the fact that some moisture pick-up in the chilling baths is practically unavoidable, and that a bird thereafter frozen by any known method, will still retain about 7–8% pick-up moisture, and that the 8% figure is therefore fair to the consumer. This requires that the pick-up moisture content be reduced from the 10% obtainable by gravity drainage of the birds after they leave the chilling baths, to no more than 8%, before they can be packaged and subsequently frozen, it not being feasible to freeze the poultry before packaging. If frozen after packaging with more than 8% pick-up moisture, some of the excess moisture would be expelled by contraction and shrinkage of the poultry caused by the freezing, but the expelled moisture would then exist in the package as free ice. This also is not permissible, and would cause penalization of the processor by U.S.D.A. inspectors. Even if some practical method of freezing the poultry before packaging could be found, so that moisture expelled by freezing could be excluded from the packaging, present freezing procedures could not be relied on to reduce the pick-up moisture content to the allowable 8%, since some of the excess moisture might be frozen solid before it could be expelled. Thus the pick-up moisture content must be reduced to the allowable 8% before packaging and freezing, and under present methods this requires suspension and gravity drainage of the birds, at temperatures below 40 deg. Fahr. but above freezing, for long periods of time, often 24 hours or more, depending somewhat on the size of the birds and other factors. This is extremely inconvenient and costly, due to the time required, and the requirement for drainage retention facilities.

If, on the other hand, the poultry is destined for fresh-pack or non-frozen handling, the processor still has a moisture problem, arising from "weepage," which may be defined as the gradual loss of moisture, and also other body fluids, from the birds at temperatures above freezing, resulting from normal drainage, evaporation, or by mechanical pressure exerted on the carcasses during handling and expelling moisture therefrom. In one sense, actual moisture removal is not then a problem, since U.S.D.A. regulations allow up to 12% pick-up moisture in fresh-pack poultry at the time of packing or packaging thereof, and this figure is easily obtainable by no more than a few minutes gravity drainage of the carcasses after they leave the chilling tanks. However, the loss of body fluids other than the picked-up water robs the poultry of certain desirable flavor and nutrient characteristics, and the weepage generally presents the processor with the problem of maintaining the weight in the product he sells. The higher allowance of pick-up moisture for fresh-pack poultry is made partially in view of the fact that the fresh-pack poultry is not packed at the processing plant in the packages in which it will eventually be sold to the ultimate consumer, but bulk-packed for repackaging at the point of ultimate sale, so that moisture leaving the poultry by weepage will not be weighed out to the consumer, and partially in recognition of the fact that, due to weepage, the moisture pick-up will have been reduced not only at least as low as 8%, but often to as low as 6%, before the consumer eventually purchases it by weight. Thus the processor must sell fresh pack poultry with full knowledge that it will continue to lose weight by weepage. He attempts to allow for it, often inserting 2–3½ extra pounds of product in a standard 70 pound packing box, while charging only for 70 pounds. This is not satisfactory, since the weepage losses vary considerably due to numerous factors such as pressures resulting from overloading of packing boxes, stacking of said boxes, and the position of a given box in the stack, inaccurate temperature control, number of handlings of the boxes, how severely the boxes may be jostled due to rough roadbeds, and others. If the processor has allowed too much tare weight it is of course a direct loss to him. If he has allowed too little the customer is short-weighted and enters a claim for a short-weight allowance against the processor. The processor generally must allow such claims, justified or not, in the absence of any practical method of effectively checking all actual delivery weights. In a generally average poultry processing plant, handling perhaps 6,000 birds per hour, these short-weight allowances may easily amount to $50,000–$150,000 annually. Even if the carcass pick-up moisture could be reduced to the allowable 8% just before packing, packaging or cut-up, which is the time they are inspected for compliance with moisture standards, they will still lose about another 2% moisture if they are then cut-up, since this opens other pockets of moisture along the cuts, and this weight loss also represents economic loss to the processor.

Accordingly, the principal object of the present invention is its provision of a method whereby the pick-up moisture content of water-bath chilled poultry can quickly, in perhaps 25–30 minutes, be reduced from the 12–14% at which it emerges from the chilling tanks to an allowable 8%.

Another object is the provision of a method as described which, by the addition of a simple additional step, stabilizes the moisture content at the acceptable level, so that no further moisture loss occurs, either during cut-up and freezing, if the poultry is to be frozen, or until eventual sale to the consumer if the poultry is to be sold unfrozen. Generally, this additional step constitutes the maintenance of the poultry, at all stages after the moisture removal steps, until freezing or sale in fresh-pack form, at a temperature above the freezing point of the flesh and skin of the poultry, which is accepted to be 26 deg. Fahr., but below the temperature at which the body fluids in the carcass will flow as liquids, which is about 30 deg. Fahr. As additional benefits of the process, it provides for positioning and retention of the carcass in a neatly squatted position, with the legs and wings folded against the torso, this being the position considered most advantageous for compact storage, shipping and display for sale, it lightens and smoothes the skin, which otherwise would be slack, loose, and unattractive, and gives the skin a commercially desirable color, and lengthens the shelf life of the product by reducing bacterial growth. When the poultry is to be cut up, the process not only prevents the uneconomical additional loss of moisture during cut-up, but also permits the cup-up to be much neater, since the cutting knives will not then cause the skin to roll with the knife or pull away from the flesh.

With these objects in view, as well as other objects which will appear in the course of the specification, the method contemplated by the present invention will be described in greater detail. In the interests of order and brevity, the method will be described as including all of its component steps necessary under any conditions, although as will appear under certain conditions some of the steps may be modified or even eliminated.

The method may include the following steps:

(1) Positioning.
(2) Pre-cooling.
(3) Frigid air blast.
(4) Tempering.
(5) Temperature maintenance.

(1) Positioning

In the chilling bath, the dressed poultry carcasses, with the feathers, head, neck, feet, and viscera removed, and having incised skin edges at the neck opening, at the abdominal opening where the viscera were removed, and at the hock joints where the feet were removed, is agitated and tumbled in ice water, in which process the animal heat is removed and the carcass temperature lowered to about 34–38 deg. Fahr., say 35 deg. Fahr. for convenient reference, and in which water is picked up in the carcass, principally into the fatty fascia layers under the skin at the cut edges of the skin, and still more particularly at the flank areas of the bird, in which the skin is free and loose, and into which the water enters from the large abdominal opening. The normally loose skin in this area has usually been further loosened by the beating action of the rubber picking fingers of the feather removing machines. To a lesser extent, water is also picked up and stored in the fascia layers under the liner layers of the internal cavity of the carcass, and in the skin itself. In this positioning step, each carcass is positioned in the attitude most conducive to efficient drainage of moisture therefrom during the shrinkage occurring during the second and third steps of the process. The best position is with the abdominal opening lowermost and neck opening uppermost and with the legs and wings flexed and folded neatly against the torso. In this position, the fascia layers under the skin open at the abdominal opening for better drainage of moisture from the bird. Particularly, the flank areas of the lower abdomen and inner thighs open downwardly to said abdominal opening, the thighs extending upwardly from the hip so that their junctures with the torso are lowermost. Birds not processed in this position often display large slabs of free ice under the skin in these flank areas, such ice not being permissible under U.S.D.A. regulations. Also, the drumstick portions of the legs extend downwardly from the knee joints to the hock joint incisions where the feet were cut away, and these incisions permit gravity egress of moisture from the drumstick fascia. Moisture expressed from the fascia at the top neck opening can flow downwardly either over the outer skin surface, or downwardly through the internal carcass cavity to the abdominal opening. Another advantage of this position is, as already mentioned, that the carcass is later stiffened and "locked" in this position by the second and third steps of the process, and that this position therefore pre-shapes the bird in the desired position for compact and efficient storage, handling, and shipping, and for attractive display. If the poultry is to be later cut up into parts, this pre-shaping is of course meaningless, but the positioning is still important for the purposes of efficient drainage discussed above. The carcasses may be positioned as described on suitable carriers mounted on conveyors movable to transport the carcasses during the second and third steps of the process.

(2) Pre-cooling

In this step each cascass, positioned as set forth above, is subjected to a sub-freezing atmosphere, whereby freezing of the skin is initiated and at least partially advanced. The skin is thereby caused to shrink to close the pores thereof to expel moisture therefrom, and to draw the skin itself smooth and taut on the flesh, whereby to expel moisture from the fascia layers under the skin, at the neck and hock openings of the skin, but predominantly at the abdominal opening due to its position. The action is much like that of expelling moisture from a saturated sponge by pressure thereon, the fascia being the sponge and the shrinking skin exterting the pressure. The atmospheric temperature must obviously be below +26 deg. Fahr. in order that the freezing and shrinkage can occur, and this is of course lower than the 32 deg. freezing temperature of the sub-dermal moisture, but the sub-dermal moisture is insulated from the atmosphere by the skin itself, so that as long as the rate of heat extraction from the carcass is properly regulated, the sub-dermal moisture can be expelled before it freezes, even when the atmosphere is at temperatures far below freezing. Of course, the expelled moisture may freeze as it emerges into the cold atmosphere, either on the carcass itself or on its carrier, but much of it will still drip free of the carcass, and that which remains will be disposed of in the third step of the process. Another characteristic of this expelling action is that it appears to be selective, discharging proportionately far more free water than other body fluids, probably due to the fact that the water is more free-flowing than the body fluids and hence more easily expelled. This retention of body fluids preserves better flavor and nutritional qualities in the meat.

As pointed out above, the rate of heat extraction in this step is very important. If it is too low, the sub-dermal temperature may be so nearly equal to that of the skin that it is lowered below 32 deg., and hence freezes, before the skin is lowered to its 26 deg. freezing and shrinking temperature, so that when the skin does shrink, the moisture is already in the form of solid ice and cannot be expelled. This consideration calls generally for an atmospheric temperature far below the carcass temperature, to insure an adequately high rate of heat extraction. On the other hand, if the rate of heat extraction is too great, freezing of sub-dermal moisture before expulsion can still occur, since the skin shrinkage is not instantaneous but requires time so that the moisture may still freeze before shrinkage can occur. The rate of heat extraction is also affected by movement of the atmospheric air, higher air velocities generally producing higher rates of heat extraction at any given temperature. It is not, however, appreciably affected by the size or weight of the carcasses, since the skin shrinkage and moisture expulsion is largely a surface reaction not affected by the depth or thickness of the flesh. Thus the rate of heat extraction depends primarily on atmospheric temperature and air velocity. While various sets of operable conditions might be arrived at by interrelating these factors in different combinations, such as higher temperatures with higher air velocities, or lower temperatures with lower air velocities, thoroughly satisfactory results are actually produced in a substantially quiescent atmosphere, which is to be desired since it requires no air circulating or regulating equipment, with an air temperature in the range of +15 to −40 deg. Fahr., of which perhaps the optimum portion is 0 to −5 deg. Fahr. with the carcasses entering the pre-cooling step at substantially the 34–38 deg. temperature to which they are lowered in the chilling baths. Under these conditions, in about 3–7 minutes, the freezing and shrinking of the skin will be well advanced, and expulsion of the sub-dermal moisture nearly completed. Best results have been obtained with a pre-cooling time of about five minutes. It is not considered desirable to complete the final expulsion of all moisture capable of being expelled at this time, since this would cause some freezing of surface flesh, and since some freezing of flesh will probably occur anyway in the third step of the process. Freezing of the flesh is to be avoided whenever possible if the carcass is to be eventually cut-up, since the freezing renders the cut-up more difficult. Also, at this point, it will be appreciated that while the sub-dermal moisture has been largely expelled, expulsion of the moisture of the fasica of the internal cavity of the carcass may scarcely have begun, since the cold air, if quiet as described, will circulate only poorly in the internal cavity. This interal moisture, together with the moisture frozen externally on the carcass, will be disposed of in the next step of the process.

(3) Frigid air blast

Immediately after the pre-cooling step above described, the carcasses are subjected to a highy-velocity blast of cold, dry air of about 0 to −5 deg. Fahr. ideally, or in a maximum range of about +15 to −40 deg. for a period of about 20 minutes ideally, although acceptable results have been obtained with blast times anywhere between 15 and 25 minutes. This air blast has three important functions.

First, it rapidly completes the freezing and shrinking of the skin and expulsion of expellable moisture from the fascia layers under the skin. This occurs, despite the fact that an air blast of that temperature would originally have caused freezing of the moisture before it could be expelled, since this moisture has already been largely expelled and its expulsion can be completed in a very short time, since the freezing of the skin itself is completed almost immediately in the air blast and thereafter forms a more efficient insulator protecting the fascia from the air blast, and since the moisture flow passages in the fascia have already been well established during the pre-cooling step and are relatively open.

Second, the air blast causes better air circulation in the internal cavity of the carcass, so that expulsion of moisture from the fascia of said cavity, which as shown above have scarcely begun in the pre-cooling step, is accomplished in the same manner as with the external fascia. Here again, about the same rate of heat extraction as before is desirable, and is provided, the higher rate which would otherwise be provided by the air velocity being offset by the higher temperature of the internal cavity caused by the insulating effect of the surrounding flesh, within reasonable limits sufficient to prevent freezing of the moisture before expulsion. Actually, expulsion of moisture from the internal fascia usually requires more time than expulsion from the sub-dermal fascia, due to its less intimate exposure to the cold air, and this is one reason for the longer duration of the air blast process step. Again, expulsion of moisture from the internal fascia is principally a surface function, not dependent on the size or weight of the carcass. Of course, some freezing of the external surface flesh will occur in the air blast, due to its necessarily longer duration, but starting the air blast before the skin is fully frozen combines the completion of its freezing with the internal action occurring during the air blast, and hence minimizes the freezing of the external surface flesh, and it can be overcome in the tempering step of the process if desired, but this would be important, again, only if the carcasses are to be cut up. The amount of excess moisture contained in the internal fascia is small compared to that contained in the sub-dermal fascia, but is still significant.

Third, and probably most importantly, the air blast, due to its dryness, carries moisture which has been expelled from the carcass, and which has not dripped away from the carcass in the early stages of the pre-cooling step but has frozen on the carcass due to exposure to the frigid air, away from the carcass. It does not melt this ice, but transfers it directly from ice to vapor in the common and well known process of sublimation. This effect, reducing the surface of the carcass to a dry, ice-free condition, requires time, and this is another reason for the longer duration of the air blast step. However, the entire moisture removal, and sublimal drying of the carcass, will have been completed, in virtually all cases, within the stated 20 minutes. The velocity of the air blast is not critical except of course that it must be ample to carry heat away from the carcass as rapidly as the heat is conducted to the surface of the carcass. Good results have been obtained with air velocities of about 10 to 50 feet per second.

At this point, the process is complete insofar as actual moisture removal is concerned, and could be terminated if considerations involved in later processing of the poultry do not exist. The pick-up moisture content of the carcass will have been reduced to 7-8% provided of course that it originally contained more than this amount, and will be reduced to this range from anywhere in an original range up to at least 14 or 15%, which is the greatest amount it is ever likely to pick up in the chilling baths. This reduction to a moisture content in the narrow 7-8% range, regardless of a wide variation in the original moisture content, is a result of the well known fact that poultry containing more than 7-8% pick-up moisture, frozen by any known method, and with all surface and free ice subsequently removed, will still retain 7-8% pick-up moisture but no more. As noted above, this is probably a principal reason for the U.S.D.A. regulations allowing 8% pick-up moisture in frozen poultry. The present method, at the end of the air blast step, will likewise have reduced the moisture pick-up content to 7-8%.

Furthermore, the moisture content of the carcass is stabilized at this point in the process, and no further moisture loss will occur either by drainage or weeping, provided that the carcasses are thereafter maintained at a temperature at least as low as about 30 deg. Fahr., above which the body fluids will again begin to flow and weepage will recommence.

If the carcasses are to be frozen wholly they may be frozen immediately after the air blast step, it being understood that that at the completion of the air blast step, only the skin, fascia, and perhaps a very thin layer of surface flesh are actually frozen hard, while the great bulk of the flesh is still well above the flesh freezing point of 26 deg. Fahr. The complete freezing of the carcass could be accomplished by continuing the air blast for a longer time, but this would require hours and is not economical. Ordinarily, the freezing would be completed in freezer compartments to which the carcasses are moved directly from the air blast.

If the carcasses are to be marketed whole in unfrozen or fresh pack condition, they may be transferred directly from the air blast step to the temperature maintenance step, which is merely the subsequent retention of the carcasses at a temperature above the freezing point of the flesh (26 deg. Fahr.) but below the flowing temperature of the body fluids (30 deg. Fahr.), at all points in the storage, shipping and display thereof until eventual sale to the consumer, so that while the flesh is never frozen, no further weepage can occur. An advantage of the approximate 20 minute duration of the air blast step is that with carcasses of the sizes most commonly slated for cut-up, say from 2-4½ pounds, this duration of the air blast, under the conditions given, will remove just enough total heat from the carcass that when the temperature of the carcass is allowed to temper evenly throughout, the carcass will be in the desired range of 26-30 deg. Fahr., so that no additional heat need be extracted during the temperature maintenance step. It also has an advantage in the tempering step to be described.

To summarize, therefore, the carcasses may proceed directly from the air blast to freezing if they are to be frozen whole, by-passing both the tempering and temperature maintenance steps, and may proceed directly from the air blast to the temperature maintenance step if they are to be marketed whole but unfrozen, by-passing the tempering step. If, however, they are to be cut up prior to either freezing or fresh-pack handling, the tempering step now to be described becomes important.

(4) Tempering

In this step, the carcasses, immediately after the air blast step, are again subjected to a substantially quiet atmosphere of about the same temperature and for about the same time as in the pre-cooling step, that is a temperature of +15 to −40 deg. for about 3-7 minutes. The temperature must be below 26 deg., to avoid thawing and hence weepage of the skin and fascia, but since the skin is now hard frozen and virtually as cold as the air, and provides a good insulation for the flesh, virtually no further heat extraction from the carcass occurs at least during the short duration of tempering. However, within its hard frozen crust, the carcass will being to temper, the surface flesh layers adjacent the skin being warmed by additional heat flowing thereto from the deeper interior portions of the flesh, which at this time will ordinarily still be above the body fluid flowing temperature of 30 deg. Thus any surface flesh which may have been frozen in the air blast step is thawed, thereby easing and facilitating the subsequent cut-up, and the deeper portions of the flesh are cooled below 30 deg., so that no further moisture loss occurs by weepage during the subsequent cut-up, which of course would otherwise open up portions of the meat still above 30 deg.

The temperature, time duration, and air velocity utilized in the tempering step are not as critical as in the pre-cooling step, since the carcass is then well insulated, at least for the time necessary, by its frozen crust, and more variations therein could be permitted. However, under the conditions given, 3-7 minutes duration has been found adequate to prevent weepage during cut-up, while a longer tempering period would be wasted time, in addition to which a longer tempering time would eventually cause undesired freezing of the flesh as more heat escapes through the frozen crust. A longer tempering time might be required for heavier birds with thicker flesh, say with carcasses over 4½ pounds, but the tempering is, as already explained, required only with birds which are to be cut up, and the heavier birds are not ordinarily cut up. The method as recited is quite satisfactory for birds under 4½ pounds, which are those usually cut up. A higher temperature might permit thawing and weepage of the sub-dermal fascia, while a lower temperature might freeze more of the flesh, instead of permitting any frozen flesh to thaw. A higher air velocity has somewhat the same effect as a lower temperature, causing additional freezing of the flesh. Arresting of the air blast at about 20 minutes, at which time the moisture removal is completed and the desired proportion of the total body heat has been extracted, at least in carcasses under 4½ pounds, is significant in the tempering step also, in that any substantially longer air blast duration would remove so much body heat and freeze so much of the flesh that it could not be readied for cut-up simply by tempering, but would require the actual addition of heat and general warming of the carcass. The adaption of a single temperature for all of the steps of pre-cooling, air blast, and tempering, with variations only as to air velocity and duration of each step, also has the economically valuable advantage of permitting all three steps to be carried out in a single cabinet refrigerated to a single temperature and through which the carcasses are moved at a uniform rate by a suitable conveyor. The cabinet may have a quiet zone through which the carcasses enter and leave the cabinet and in which the pre-cooling and tempering steps are performed, and a zone in which high-velocity air current is maintained, through which the carcasses move between the pre-cooling and tempering step and in which the air blast step is performed, the longer duration of the air blast step being provided by a longer conveyor path in the latter zone.

(5) Temperature maintenance

After tempering and cut-up, or after the air blast step if the carcasses are not to be cut up since tempering is not then required, the carcasses are commonly either packaged in film bags or the like and frozen, or, if to be marketed as fresh-pack poultry, are bulk-packed for shipment. If frozen in the conditions they emerge from cut-up or air blast, no further weepage or loss of moisture into the packages will occur, and the pick-up moisture content will be at or slightly below the allowable maximum, as already described. If destined for fresh-pack sale, they must be subjected to the temperature maintenance step of a process, which as already described consists merely of maintaining the temperature of the carcasses within a range below 30 deg. Fahr., above which the body fluids would flow and weepage would occur, but above 26 deg. Fahr., below which the flesh would of course be frozen. As long as temperatures in this range are maintained, and they should be so maintained at all times up to sale to the eventual consumer, no weepage will occur, and the weight thereof will remain stabilized.

While I have described a specific embodiment of my invention, it will be readily apparent that many minor changes in the various steps of the method could be made without departing from the spirit of the invention.

What I claim as new and desire to protect by Letters Patent is:

1. A method of removing moisture from cleaned poultry carcasses having cut skin edges and bodily openings to the interior cavities thereof resulting from the cleaning thereof, and previously chilled by immersion in cold water baths, at which time the bath water enters into the porous skin and into the fascia layers beneath the skin and within the internal cavities thereof, consisting of the successive steps, prior to packing, packaging, or cut-up thereof, of:

(a) arranging each carcass in an attitude conductive to gravity drainage of moisture thereof, (b) pre-cooling said carcass is a relatively quite atmosphere, substantially lower in temperature than the freezing point of the skin and flesh of the carcass, for a time sufficient to initiate and nearly complete freezing of the skin, whereby said skin shrinks to close the pores to expel moisture therefrom, and to expel moisture from the fascia layers beneath the skin at the cut edges of the skin, and sufficient to initiate freezing and shrinkage of the lining of the internal carcass cavity covering the fascia layers thereof, said expelled moisture not being frozen prior to explusion due to the insulating effect of said skin and cavity lining, but a portion thereof freezing on the surface of the carcass after exposure to the cold atmosphere, and (c) subjecting said carcass to a relatively high-velocity blast of cold dry air, still at a temperature substantially below the freezing point of the skin and flesh, and having a velocity sufficiently high to carry heat away from the carcass as rapidly as it is conducted to the surface thereof, and for a time sufficient to complete the freezing and shrinking of the skin and internal cavity lining to complete the expulsion of expellable moisture, and to permit said air blast to vaporize and carry away any moisture frozen on the carcass surface by a process of sublimation.

2. A method as recited in claim 1 wherein each carcass has an abdominal opening formed therein for the removal of viscera during the cleaning thereof, and wherein said carcass is positioned with said abdominal opening lowermost.

3. A method as recited in claim 2 wherein each carcass additionally has a neck opening formed by removal of the neck, and a hock opening at each hock joint formed by removal of the feet, during the cleaning thereof, and wherein said carcass is positioned with said abdominal opening lowermost, said neck opening uppermost, and with the legs flexed and folded against the torso, whereby said legs extend upwardly from the hip joints to the knee joints, and downwardly from the knee joints to the hock joints.

4. A method as recited in claim 1 wherein each carcass enters the pre-cooling step with about the 34–38 deg. Fahr. temperature resulting from the prior chilling bath, and wherein said precooling is carried out in a substantially quiet atmosphere, at a temperature in a range from +15 to −40 deg. Fahr., for a time in the range of 3–7 minutes.

5. A method as recited in claim 4 wherein said pre-cooling atmosphere is at a temperature of 0 to −5 deg. Fahr., and the duration of the pre-cooling step is about 5 minutes.

6. A method as recited in claim 4 wherein said air blast is at a temperature in a range from +15 to −40 deg. Fahr., and is maintained for from 15 to 25 minutes.

7. A method as recited in claim 6 wherein said air blast is at a temperature of 0 to −5 deg. Fahr., and is maintained for about 20 minutes.

8. A method as recited in claim 1 with the additional step, subsequent to the air blast step, of tempering each carcass in a relatively quiet atmosphere at a temperature substantially below the freezing point of the skin and flesh, for a time sufficient to allow the temperature of the carcass, throughout substantially the entire mass thereof, to be reduced to a temperature below the flowing temperature of the body fluids of the carcass, which is about 30 deg. Fahr.

9. A method as recited in claim 8 wherein the pre-cooling, air blast and tempering steps are all performed at a temperature in the range of +15 to −40 deg. Fahr., wherein the pre-cooling and tempering steps are performed in substantially quiet atmospheres for like periods of 3–7 minutes, and wherein said air blast step is performed for a period of 15–25 minutes.

10. A method as recited in claim 8 wherein the pre-cooling, air blast and tempering steps are carried out at an air temperature of 0 to −5 deg. Fahr., the precooling and temperature steps being continued for like periods of about 5 minutes each, and the air blast step being continued for about 20 minutes.

11. A method as recited in claim 1 with the additional step, subsequent to the air blast step, of subsequently maintaining the temperature of each carcass, at all times until eventual sale thereof, at a temperature above the freezing temperature of the skin and flesh of the carcass, but below the flowing temperature of the body fluids of the carcass, namely between 26 and 30 deg. Fahr.

12. A method as recited in claim 8 with the additional step, subsequent to said tempering step, of subsequently maintaining the temperature of each carcass, at all times until eventual sale thereof, at a temperature above the freezing temperature of the skin and flesh of the carcass, but below the flowing temperature of the body fluids of the carcass, namely between 26 and 30 deg. Fahr.

References Cited
UNITED STATES PATENTS

| | | | |
|---|---|---|---|
| 2,560,067 | 7/1951 | Bell | 99—107 X |
| 3,020,732 | 2/1962 | Carpenter | 99—194 X |
| 3,060,036 | 10/1962 | Van Dolah | 99—194 |
| 3,193,392 | 7/1965 | Lundquist et al. | 99—194 X |
| 3,359,122 | 12/1967 | Zebarth et al. | 99—194 |

NORMAN YUDKOFF, Primary Examiner
K. P. VAN WYCK, Assistant Examiner

U.S. Cl. X.R.
99—107